United States Patent [19]
Meyer

[11] Patent Number: 5,398,779
[45] Date of Patent: Mar. 21, 1995

[54] CLIMBING TREE BLIND

[76] Inventor: James R. Meyer, 1043 Baxter Ave., Louisville, Ky. 40204

[21] Appl. No.: 183,872

[22] Filed: Jan. 21, 1994

[51] Int. Cl.⁶ .............................................. A01M 31/02
[52] U.S. Cl. ..................................... 182/187; 182/136
[58] Field of Search ................. 182/187, 188, 133–136, 182/129

[56] References Cited

U.S. PATENT DOCUMENTS

| | | | |
|---|---|---|---|
| 3,485,320 | 12/1969 | Jones | 182/187 X |
| 4,069,891 | 1/1978 | McClung | 182/187 |
| 4,134,474 | 1/1979 | Stavenau et al. | 182/187 |
| 4,137,995 | 2/1979 | Fonte | 182/187 X |
| 4,410,066 | 10/1983 | Swett | 182/187 X |
| 5,117,942 | 6/1992 | Tzavaras | 182/187 X |

FOREIGN PATENT DOCUMENTS

| | | | |
|---|---|---|---|
| 2617769 | 11/1977 | Germany | 182/133 |
| 54026 | 9/1910 | Switzerland | 182/133 |

Primary Examiner—Alvin C. Chin-Shue

[57] ABSTRACT

A device to aid an individual in climbing a tree and to provide shelter to the individual when in the tree. The device comprises a lower platform including a lower ring of steel tubing. The lower ring has a top, a bottom, a first side and a second side. A floor is bolted to the top of the lower ring. The floor has a top and a bottom. A set of nylon straps are bolted to the top of the floor. A lower climbing assembly is adapted to be secured about a tree trunk. The lower climbing assembly is secured to the lower ring. An upper ring of steel tubing is included in the device. The upper ring has a top, a bottom, a first side and a second side. An upper climbing assembly is adapted to be secured about a tree trunk. The upper climbing assembly is secured to the upper ring. A tubular cloth blind having a first end with a first perimeter, and a second end with a second perimeter is included in the device. The first perimeter is secured to the upper ring and second perimeter is secured to the lower ring.

4 Claims, 4 Drawing Sheets

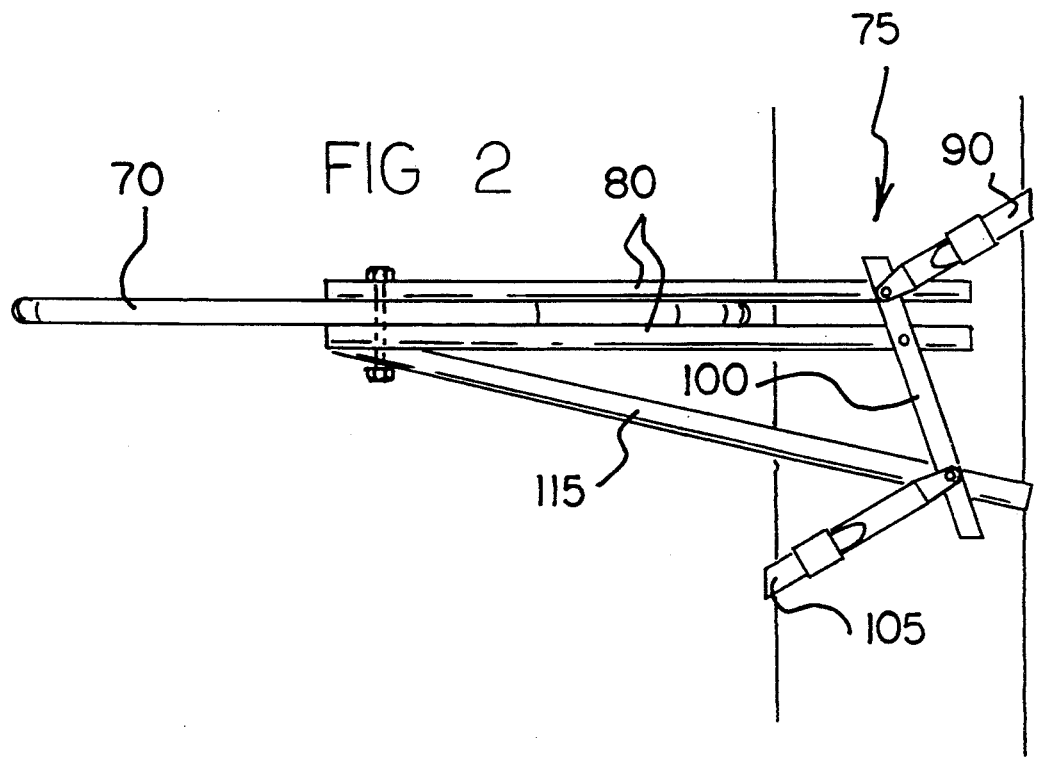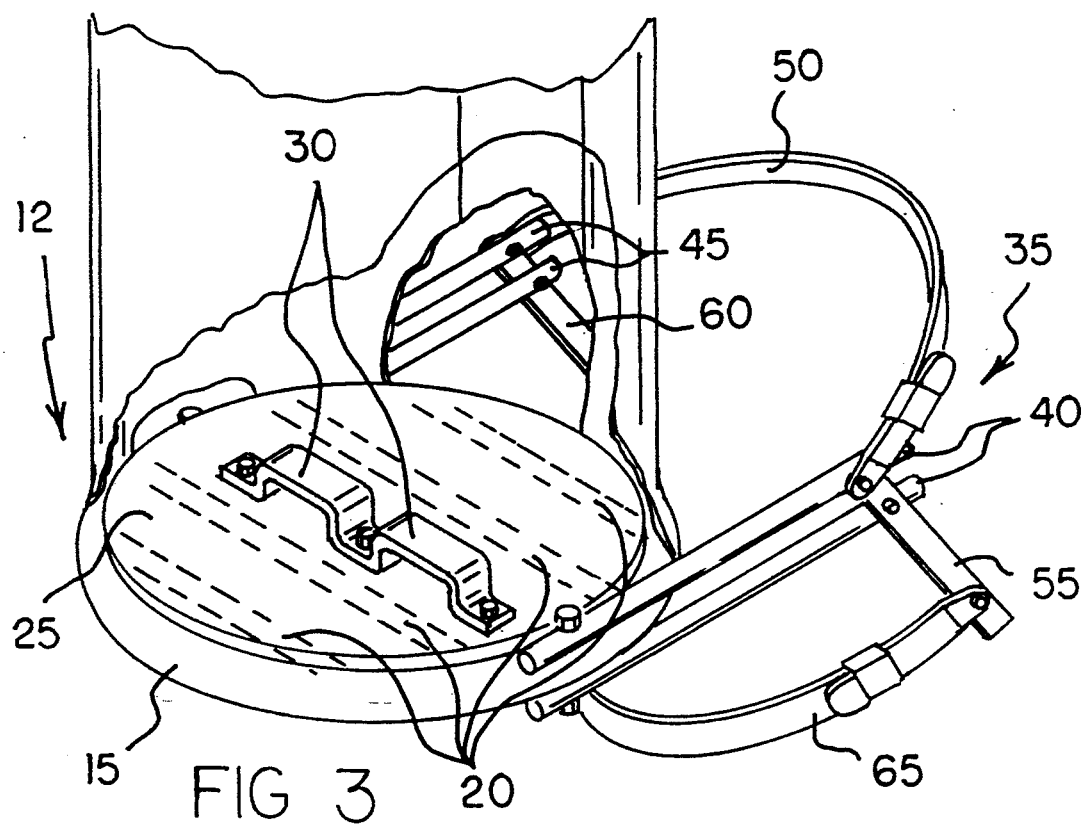

CLIMBING TREE BLIND

BACKGROUND OF THE INVENTION

1. Field of the Invention

The present invention relates to climbing tree blind and more particularly pertains to a device to aid a user in climbing a tree, and to provide a user shelter when in the tree.

2. Description of the Prior Art

The use of tree stands is known in the prior art. More specifically, tree stands heretofore devised and utilized for the purpose of climbing a tree are known to consist basically of familiar, expected, and obvious structural configurations, notwithstanding the myriad of designs encompassed by the crowded prior art which has been developed for the fulfillment of countless objectives and requirements.

For example, U.S. Pat. No. 4,417,645 to Untz discloses a portable tree climbing device. The device includes two assemblies, a main body supporting member and a foot supporting assembly.

U.S. Pat. No. 3,460,649 to Baker et al. discloses a tree climbing-hunting platform.

U.S. Pat. No. 5,156,236 to Gardner et al. discloses a climbing tree stand. The apparatus has two frames, each frame having a rigid base portion with a flexible adjustable tree encircling band mounted thereon.

U.S. Pat. No. 4,987,972 to Helms discloses a tree climbing stand. The stand has two separate climbing assemblies.

Finally, U.S. Pat. No. 5,143,176 to Burdette discloses a climbing apparatus which provides a mechanical means of ascending or descending any generally vertical member such as a tree.

In this respect, the climbing tree blind according to the present invention substantially departs from the conventional concepts and designs of the prior art, and in doing so provides an apparatus primarily developed for the purpose of climbing a tree, and for providing the user shelter when in the tree.

Therefore, it can be appreciated that there exists a continuing need for new and improved climbing tree blind which can be used for providing a user shelter when in a tree. In this regard, the present invention substantially fulfills this need.

SUMMARY OF THE INVENTION

In view of the foregoing disadvantages inherent in the known types of tree stands now present in the prior art, the present invention provides an improved climbing tree blind. As such, the general purpose of the present invention, which will be described subsequently in greater detail, is to provide a new and improved climbing tree blind and method which has all the advantages of the prior art and none of the disadvantages.

To attain this, the present invention essentially comprises a device to aid an individual in climbing a tree and to provide shelter to the individual when in the tree. The device includes a lower platform having a lower ring of steel tubing. The lower ring has a top, a bottom, a first side and a second side. A plurality of steel support rods form cords across the lower ring. A plywood floor is bolted to the top of the lower ring. The plywood floor has a top and a bottom. A set of nylon straps are bolted to the top of the plywood floor. A lower climbing assembly in included in the device. The lower climbing assembly comprises a first pair of tubular elements. Each tubular element of the pair has a first end and a second end, with the first ends of the first pair of tubular elements bolted to the first side of the lower ring. The lower climbing assembly also includes a second pair of tubular elements. Each tubular element of the pair has a first end and a second end, with the first ends of the second pair of tubular elements bolted to the second side of the lower ring. An upper strap, having a first end and a second end, is included in the climbing assembly. The first end of the strap is pivotally secured to one of the tubular elements of the first pair. The second end of the strap is pivotally secured to one of the tubular elements of the second pair. A first and second brace are also included in the lower climbing assembly. The first brace has a top end and a bottom end. The top end of the first brace is pivotally connected to the first pair of tubular elements. The second brace has a top end and a bottom end. The top end of the second brace is pivotally connected to the second pair of tubular elements. A lower strap is also included in the climbing assembly. The lower strap has a first end and a second end. The first end of the lower strap is pivotally connected to the bottom end of the first brace. The second end of the lower strap is pivotally connected the bottom end of the second brace. An upper ring of steel tubing forms part of the climbing device. The upper ring has a top, a bottom, a first side and a second side. The device also includes an upper climbing assembly. The upper climbing assembly comprises a first and a second pair of tubular elements. Each tubular element of the first pair has a first end and a second end. The first ends of the first pair of tubular elements are bolted to the first side of the upper ring. Each tubular element of the second pair has a first end and a second end. The first ends of the second pair of tubular elements are bolted to the second side of the upper ring. An upper strap is included in the climbing assembly. The upper strap has a first end and a second end. The first end of the strap is pivotally secured to one of the tubular elements of the first pair. The second end of the strap is pivotally secured to one of the tubular elements of the second pair. The climbing assembly also includes a first and a second brace. The first brace has a top end and a bottom end. The top end of the first brace is pivotally connected to the first pair of tubular elements. The second brace has a top end and a bottom end. The top end of the second brace is pivotally connected to the second pair of tubular elements. The climbing assembly also includes a lower strap. The lower strap has a first end and a second end. The first end of the lower strap is pivotally connected to the bottom end of the first brace. The second end of the lower strap is pivotally connected the bottom end of the second brace. Additionally, first and second support bars are included in the climbing assembly. The first support bar has a first end and a second end. The first end of the first support bar is secured to the bottom end of the first brace. The second end of the first support bar is secured to the first side of the upper ring. The second support bar has a first end and a second end. The first end of the second support bar is secured to the bottom end of second brace. The second end of the second support bar is secured to the second side of the upper ring. A tubular cloth blind having a first end with a first perimeter, and a second end with a second perimeter in included in the device. The first perimeter is secured to the upper ring and second perimeter is secured to the lower ring.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved climbing tree blind which have all the advantages of the prior art tree stands and none of the disadvantages.

It is another object of the present invention to provide new and improved climbing tree blind which may be easily and efficiently manufactured and marketed.

It is further object of the present invention to provide new and improved climbing tree blind which are of durable and reliable constructions.

An even further object of the present invention is to provide new and improved climbing tree blind which are susceptible of a low cost of manufacture with regard to both materials and labor, and which accordingly are then susceptible of low prices of sale to the consuming public, thereby making such climbing tree blind economically available to the buying public.

Still yet another object of the present invention is to provide new and improved climbing tree blind which provide in the apparatuses and methods of the prior art some of the advantages thereof, while simultaneously overcoming some of the disadvantages normally associated therewith.

Even still another object of the present invention is to aid a user in climbing a tree and provide a user shelter when in the tree.

Lastly, it is an object of the present invention to provide new and improved device to aid an individual in climbing a tree and to provide shelter to the individual when in the tree. The device comprises a lower platform including a lower ring of steel tubing. The lower ring has a top, a bottom, a first side and a second side. A floor is bolted to the top of the lower ring. The floor has a top and a bottom. A set of nylon straps are bolted to the top of the floor. A lower climbing assembly is adapted to be secured about a tree trunk. The lower climbing assembly is secured to the lower ring. An upper ring of steel tubing is included in the device. The upper ring has a top, a bottom, a first side and a second side. An upper climbing assembly is adapted to be secured about a tree trunk. The upper climbing assembly is secured to the upper ring. A tubular cloth blind having a first end with a first perimeter, and a second end with a second perimeter is included in the device. The first perimeter is secured to the upper ring and second perimeter is secured to the lower ring.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a view of the upper climbing assembly in accordance with the first embodiment of the present invention.

FIG. 3 is a view of the lower climbing assembly in accordance with the first embodiment of the present invention.

The same reference numerals refer to the same parts through the various Figures.

DESCRIPTION OF THE PREFERRED EMBODIMENT

Figure 1:
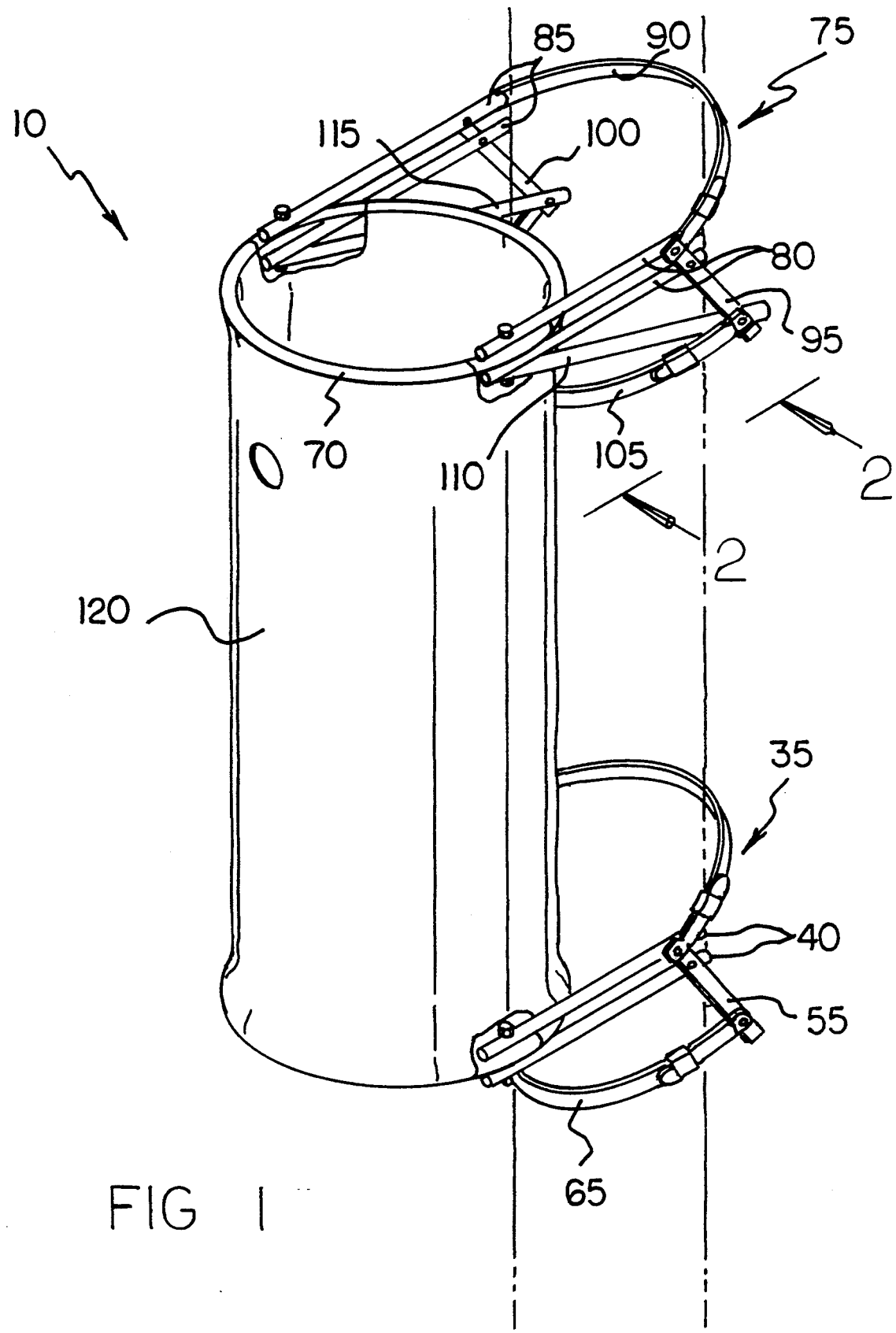
FIG. 1 is a perspective view of the preferred embodiment of the climbing tree blind constructed in accordance with the principles of the present invention.
Figure 4:
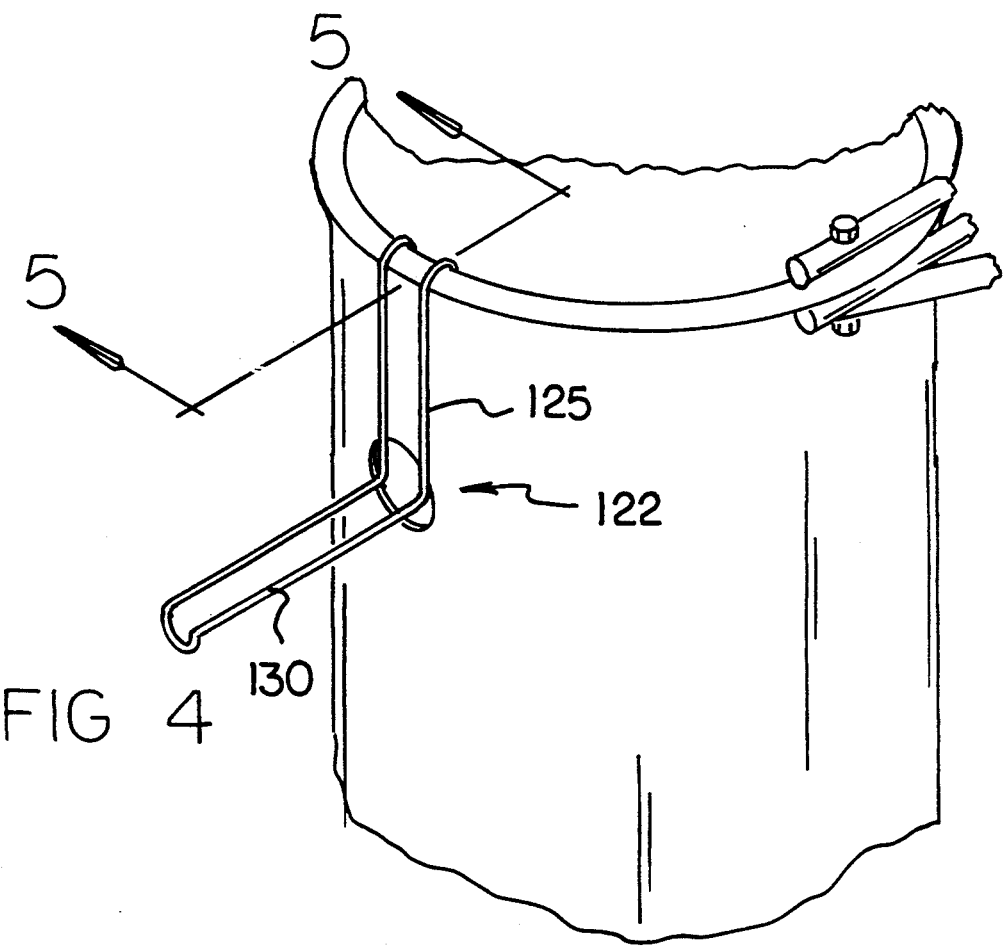
FIG. 4 is a view of the support in accordance with the second embodiment of the present invention.
Figure 5:
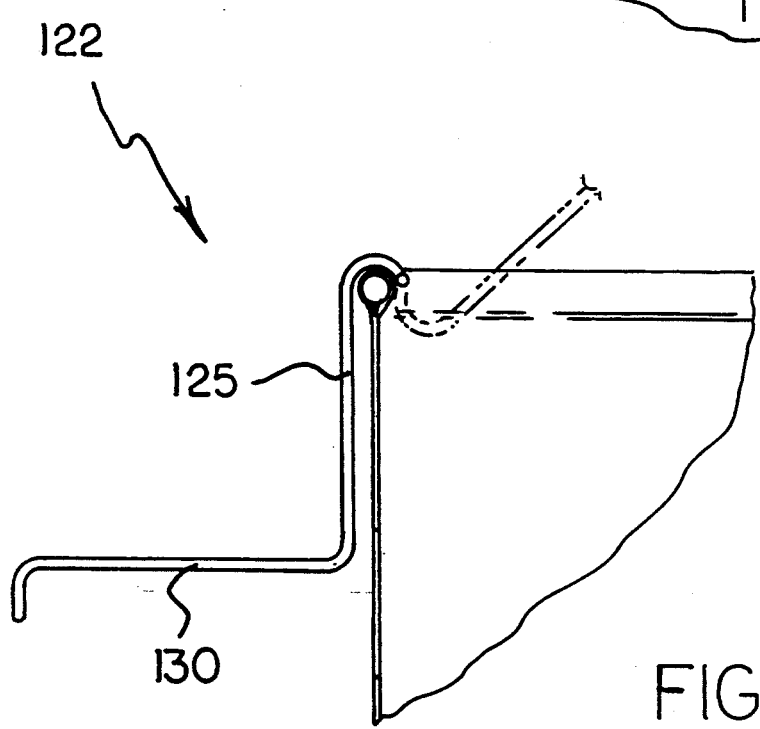
FIG. 5 is a cross-sectional view taken along line 5—5 of FIG. 4.
Figure 6:
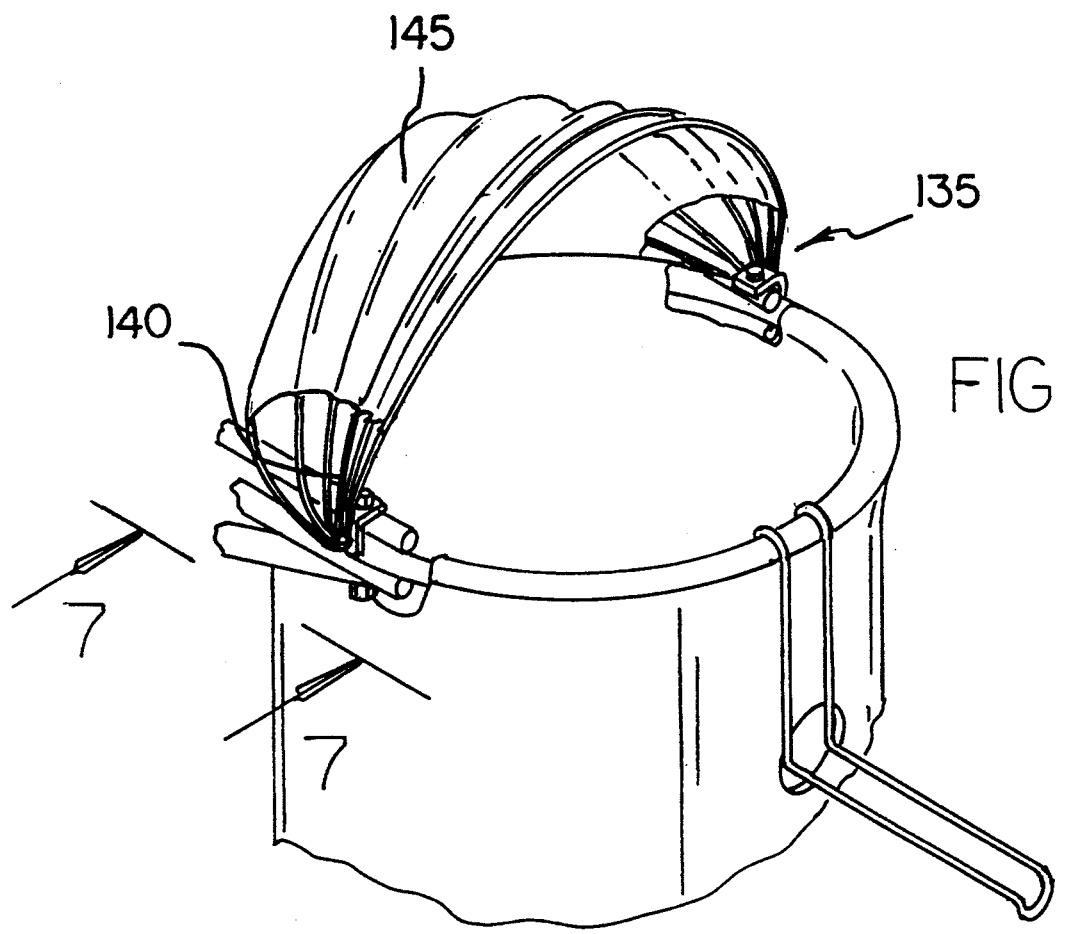
FIG. 6 is a view of the canopy in accordance with the third embodiment of the present invention.
Figure 7:
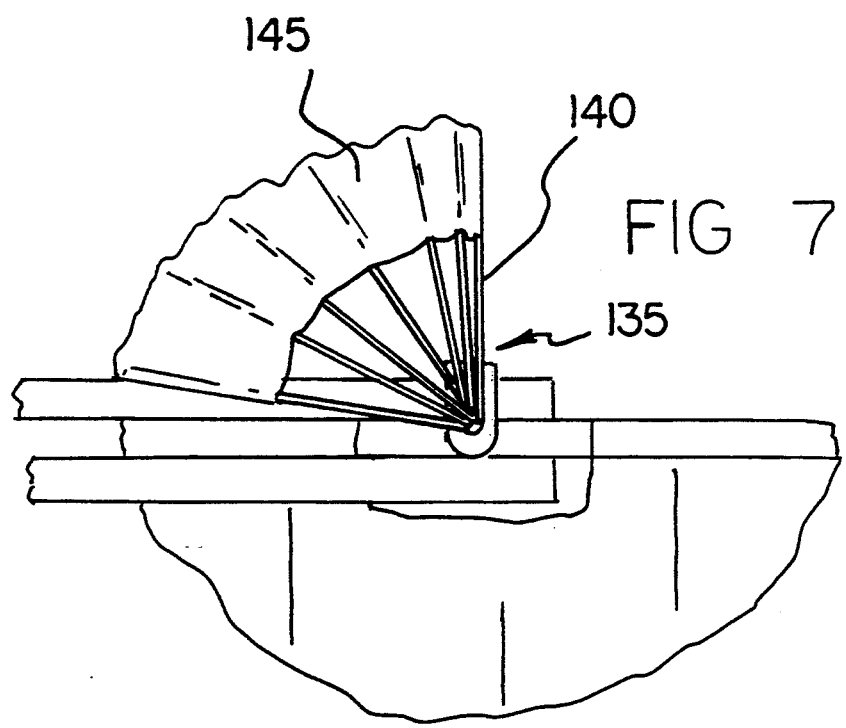
FIG. 7 is a cross-sectional view taken along line 7—7 of FIG. 6.

With reference now to the drawings, and in particular to FIG. 1 thereof, the preferred embodiment of the new and improved climbing tree blind embodying the principles and concepts of the present invention and generally designated by the reference numeral 10 will be described.

The present invention relates to a device 10 which aids an individual in climbing a tree and provides shelter to an individual when they are in a tree. In its broadest context, the device includes a lower platform 12 secured to a lower climbing assembly 35, and an upper ring 70 secured to an upper climbing assembly 75. The upper 75 and lower 35 climbing assemblies are both adapted to be secured about a tree trunk.

The lower platform 12 includes a lower ring of steel tubing 15. The lower ring 15 includes a top, a bottom, a first side and a second side. A plurality of steel support rods 20 are incorporated into the lower platform 12. The support rods 20 are positioned to form cords across the lower ring 15. A plywood floor 25 is bolted to the top of the lower ring 15. The plywood floor 25 is the surface upon which the user stands. The plywood floor 25 includes a top and a bottom. A set of nylon straps 30 are bolted to the top of the plywood floor 25. In use, the user employs the nylon straps 30 in lifting the lower platform 12 as they climb the tree.

Secured to the lower platform 12 is lower climbing assembly 35. The lower climbing 35 assembly includes a first pair of tubular elements 40. Each tubular element of the pair includes a first end and a second end. The first ends of the first pair of tubular elements are bolted to the first side of the lower ring 15. Furthermore, the lower climbing 35 assembly includes a second pair of tubular elements 45. Each tubular element of the pair includes a first end and a second end. The first ends of the second pair of tubular elements are bolted to the second side of the lower ring 15.

An upper strap 50 having a first end and a second end is incorporated in the lower climbing assembly 35. The upper strap 50 incorporates a length adjusting means in order to selectively vary the length of the strap. The first end of the upper strap 50 is pivotally secured to one of the tubular elements of the first pair 40, and the second end of the strap is pivotally secured to one of the tubular elements of the second pair 45. A first brace 55 which includes a top end and a bottom end is also incorporated in the lower climbing assembly 35. The top end of the first brace 55 is pivotally connected to the first pair of tubular elements 40. Furthermore, a second brace 60 which includes a top end and a bottom end is incorporated into the lower climbing assembly 35. The top end of the second brace 60 is pivotally connected to the second pair of tubular elements 45.

In addition to the upper strap 50, the climbing assembly also employs a lower strap 65. Like the upper strap 50, the lower strap 65 includes a length adjusting means in order to selectively adjust the length of the strap. The lower strap 65 has a first end and a second end. The first end of the lower strap 65 is pivotally connected to the bottom end of the first brace 55. The second end of the lower strap 65 is pivotally connected the bottom end of the second brace 60.

The upper ring 70 is constructed from a steel tubing. The upper ring 70 includes a top, a bottom, a first side and a second side. Secured to the upper ring is an upper climbing assembly 75. The upper climbing assembly 75 is substantially the same as the lower climbing assembly 35. The upper climbing assembly 75 comprises a first pair of tubular elements 80. Each tubular element of the pair includes a first end and a second end. The first ends of the first pair of tubular elements 80 are bolted to the first side of the upper ring 70. The upper climbing assembly 75 further includes a second pair of tubular elements 85. Each tubular element of the pair includes a first end and a second end. The first ends of the second pair of tubular elements 85 are bolted to the second side of the upper ring 70.

An upper strap 90 which includes a first end and a second end is incorporated in the upper climbing assembly 75. The upper strap 90 includes a length adjusting means to selectively adjust the length of the strap. The first end of the upper strap 90 is pivotally secured to one of the tubular elements of the first pair 80. Likewise, the second end of the strap 90 is pivotally secured to one of the tubular elements of the second pair 85. A first brace 95 which includes a top end and a bottom end is also incorporated in the upper climbing assembly 75. The top end of the first brace 95 is pivotally connected to the first pair of tubular elements 80. Furthermore, a second brace 100 which includes a top end and a bottom end is incorporated into the upper climbing assembly 75. The top end of the second brace 100 is pivotally connected to the second pair of tubular elements 85.

In addition to the upper strap 90, the climbing assembly 75 includes a lower strap 105. As with the upper strap 90, the lower strap 105 includes a length adjusting means to selectively adjust the length of the strap. The lower strap 105 includes a first end and a second end. The first end of the lower strap 105 is pivotally connected to the bottom end of the first brace 95. The second end of the lower strap 105 is pivotally connected the bottom end of the second brace 100.

Unlike the lower climbing assembly 35, the upper climbing assembly 75 employs first 110 and second 115 support bars. The first support bar 110 includes a first end and a second end. The first end of the first support bar 110 is secured to the bottom end of the first brace 95. The second end of the first support bar 110 is secured to the first side of the upper ring 70. The second support bar 115 includes a first end and a second end. The first end of the second support bar 115 is secured to the bottom end of second brace 100, and the second end of the second support bar 115 is secured to the second side of the upper ring 70.

The upper ring 70 and the lower platform 12 are interconnected by way of a tubular cloth blind 120. The tubular cloth blind 120 has a first end with a first perimeter, and a second end with a second perimeter. The first perimeter is secured to the upper ring 70 and the second perimeter is secured to the lower ring 15. The tubular cloth blind 120 functions to provide shelter for the operator of the device. Although in the preferred embodiment the blind 120 is constructed of cloth, it could also be constructed from a plastic material. The blind 120 incorporates a viewing opening intermediate its first and second ends. In addition to the viewing opening the blind can also incorporate a gun or camera hole. The cloth is preferably of a canvas material and is preferably fabricated during the manufacturing process of an oversized construction so as to accommodate the movement of the user and canvas during climbing.

In use, the operator first secures the straps of the upper 75 and lower 35 climbing assemblies around the trunk of the tree to be climbed. The operator then inserts their feet into the nylon foot straps 30 of the lower platform 12. The operator then begins to climb the tree. Climbing is achieved by first moving the upper ring 70 up the tree. After the upper ring 70 is moved, the lower platform 12 is moved up the tree by way of the foot straps 30. Both the upper 75 and lower 35 climbing assemblies are constructed such that when weight is applied to the upper 70 or lower 15 rings no vertical movement by the climbing assemblies 35 or 75 is permitted. Likewise, when weight is removed from either of the rings 70 or 15, its corresponding climbing assembly 35 or 75 is permitted to be moved vertically.

The second embodiment of the device incorporates the use of a wire support 122. The wire support 122 includes a first end, a second end, a first extent 125, and a second extend 130, with the second 130 and first 125 extents being formed perpendicular to one another. The first end of the support is adapted to be removably secured to the upper ring. When the first end is secured to the upper ring, the first extent 125 lies parallel to the tubular blind 120, and a second extent 130 lies perpendicular to the tubular blind 120. The second extent 130 of the support is adapted to be employed as a gun or camera rest.

The third embodiment of the present invention employs the use of an umbrella 135. The umbrella 135 of the third embodiment includes an umbrella canopy. The umbrella canopy includes a plurality of arcuate ribs 140. Each of the ribs 140 shares a common first end and a common second end. The first end is secured to the first side of the upper ring 70, and the second end is secured to the second side of the upper ring 70. The ribs 140 are pivotally connected to one another at the first and second ends. A cloth cover 145 serves to cover the plurality of ribs 140. Together the cloth cover 145 and the canopy serve as a cover for the upper ring 70.

The present device would be used by hunters, bird watchers, nature photographers, and the like, to conceal their presence. It enables them to view a wide area from a strategic height, which has a considerable advantage over standing on the ground, completely exposed. The blind is clamped around the trunk of a tree, and can be set at any height. It is easily erected and can be taken down just as readily. This unit is both stable and rigid, with a method of attaching it around the tree which is completely reliable. The unit is thus inherently of an exceedingly safe construction. Additional safety may be imparted by a supplemental strap or straps on the outer rim or rims, upper and/or lower, that would be drawn taut after the blind is settled in position for use.

The user stands on a lower platform which is made of steel tubing formed into a ring which is 22" in diameter, braced with chords on 6" centers. A floor made of ½" thick marine plywood is bolted on top of the ring. Nylon foot straps are bolted to the floor to enable the occupant to lift the platform when climbing the tree. A similar but hollow ring is provided to encircle the occupant to prevent them from falling out accidentally, and to lift themselves up as they raise the lower platform to climb the tree. The climbing is accomplished in the same manner as a pole climber, using two devices which are alternately clamped and raised up the rope. Each ring is mounted on a cantilever system made of chromium ally stainless steel bars, by means of pins which allow the levers to accommodate any diameter of tree. Adjustable nylon straps are provided on both of the outer ends of each linkage to grip the tree trunk. A double stitched enclosure of treated canvas, attached to the upper and lower ring conceals the occupant, who can see through a hole provided for that purpose. The device is warm in the winter and can also serve as a back pack. It can be set up without making any noise which would disturb the wild life.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A device to aid an individual in climbing a tree and to provide shelter to the individual when in the tree, the device comprising in combination:

a lower platform comprising a lower ring of steel tubing, the lower ring having a top, a bottom, a first side and a second side, a plurality of steel support rods forming cords across the lower ring, a plywood floor bolted to the top of the lower ring, the plywood floor having a top and a bottom, a set of nylon straps bolted to the top of the plywood floor;

a lower climbing assembly comprising a first pair of tubular elements, each tubular element of the pair having a first end and a second end, the first ends of the first pair of tubular elements bolted to the first side of the lower ring, and a second pair of tubular elements, each tubular element of the pair having a first end and a second end, the first ends of the second pair of tubular elements bolted to the second side of the lower ring, an upper strap having a first end and a second end, the first end of the strap being pivotally secured to one of the tubular elements of the first pair, the second end of the strap being pivotally secured to one of the tubular elements of the second pair, a first brace having a top end and a bottom end, the top end of the first brace being pivotally connected to the first pair of tubular elements, a second brace having a top end and a bottom end, the top end of the second brace being pivotally connected to the second pair of tubular elements, a lower strap having a first end and a second end, the first end of the lower strap being pivotally connected to the bottom end of the first brace, the second end of the lower strap being pivotally connected the bottom end of the second brace;

an upper ring of steel tubing, the upper ring having a top, a bottom, a first side and a second side;

an upper climbing assembly comprising a first pair of tubular elements, each tubular element of the pair having a first end and a second end, the first ends of the first pair of tubular elements bolted to the first side of the upper ring, and a second pair of tubular elements, each tubular element of the pair having a first end and a second end, the first ends of the second pair of tubular elements bolted to the second side of the upper ring, an upper strap having a first end and a second end, the first end of the strap being pivotally secured to one of the tubular elements of the first pair, the second end of the strap being pivotally secured to one of the tubular elements of the second pair, a first brace having a top end and a bottom end, the top end of the first brace being pivotally connected to the first pair of tubular elements, a second brace having a top end and a bottom end, the top end of the second brace being pivotally connected to the second pair of tubular elements, a lower strap having a first end and a second end, the first end of the lower strap being pivotally connected to the bottom end of the first brace, the second end of the lower strap being pivotally connected the bottom end of the second brace, a first support bar having a first end and a second end, the first end of the first support bar being secured to the bottom end of the first brace, the second end of the first support bar being secured to the first side of the upper ring, a second support bar having a first end and a second end, the first end of the second support bar being secured to the bottom end of second brace, the second end of the second support bar being secured to the second side of the upper ring; and a tubular cloth blind having a first end with a first perimeter, and a second end with a second perimeter, the first perimeter being secured to the upper ring and second perimeter being secured to the lower ring.

2. A device to aid an individual in climbing a tree and to provide shelter to the individual when in the tree, the device comprising, in combination:

a lower platform comprising a lower ring of steel tubing, the lower ring having a top, a bottom, a first side and a second side, a floor bolted to the top of the lower ring, the floor having a top and a bottom a set of nylon straps bolted to the top of the floor;

a flexible lower climbing assembly adapted to be secured entirely around a tree trunk, the lower climbing assembly being secured to the lower ring;

an upper ring of steel tubing, the upper ring having a top, a bottom, a first side and a second side;

a flexible upper climbing assembly adapted to be secured entirely around a tree trunk, the upper climbing assembly being secured to the upper ring; and a tubular cloth blind having a first end with a first perimeter, and a second end with a second perimeter, the first perimeter being secured to the upper ring and second perimeter being secured to the lower ring.

3. The device as described in claim 2 and further comprising:

a wire support having a first end, a second end, a first extent, and a second extent, the second and first extents being perpendicular to one another, the first end of the support adapted to be removably secured to the upper ring, with the first end of the support secured to the upper ring the first extent lies parallel to the tubular blind, and a second extent lies perpendicular to the tubular blind, the second extent of the support adapted to be employed as a gun rest.

4. The device as described in claim 2 and further comprising:

an umbrella canopy comprising a plurality of arcuate ribs, each rib sharing a common first end and a common second end, the first end being secured to the first side of the upper ring, the second end being secured to the second side of the upper ring, the ribs being pivotally connected to one another at the first and second ends; and a cloth covering the plurality of ribs, the cloth serving to cover the upper ring.

* * * * *